United States Patent
Sokolow

[11] 3,899,276
[45] Aug. 12, 1975

[54] ANNULAR EXTRUSION DIE WITH BACK PRESSURE CONTROL

[75] Inventor: Nickolas Sokolow, Roscoe, Ill.

[73] Assignee: Beloit Corporation, Beloit, Wis.

[22] Filed: May 29, 1973

[21] Appl. No.: 364,523

[52] U.S. Cl. ............... 425/380; 425/461; 425/467
[51] Int. Cl. ............................................ B29d 23/04
[58] Field of Search ........ 425/380, 461, 467, 326 R, 425/DIG. 205; 264/209

[56] References Cited
UNITED STATES PATENTS

| | | | |
|---|---|---|---|
| 1,182,199 | 5/1916 | Norris | 425/467 X |
| 1,768,671 | 7/1930 | Devine | 425/467 |
| 2,987,766 | 6/1961 | Porter | 425/467 |
| 3,074,108 | 1/1963 | Wiley et al. | 425/66 |
| 3,583,033 | 6/1971 | Christofas et al. | 425/326 X |
| 3,666,390 | 5/1972 | Gerow | 425/380 |

FOREIGN PATENTS OR APPLICATIONS
615,768  1/1961  Italy .................................. 264/209

Primary Examiner—R. Spencer Annear
Attorney, Agent, or Firm—Hill, Gross, Simpson, Van Santen, Steadman, Chiara & Simpson

[57] ABSTRACT

An annular extrusion die adapted to control back pressure and suitable for making pipe, tubing, parisons, and the like when in combination with, for example, a single screw extruder. The die employs a choke ring demountably seated in either the die body or the mandrel and located in the region between the spider and the land area. The choke ring is adapted to reduce the cross section of the passageway defined between the mandrel and the die body to a predetermined extent.

6 Claims, 10 Drawing Figures

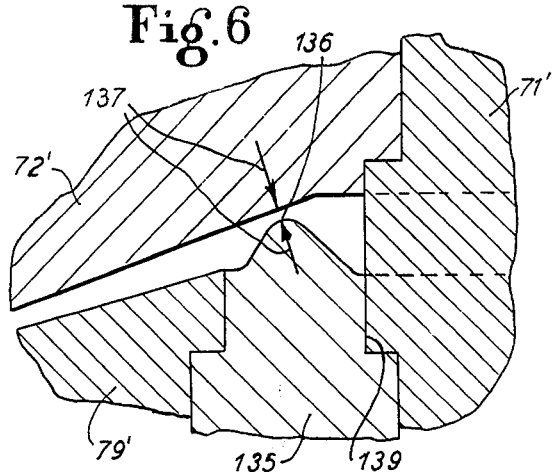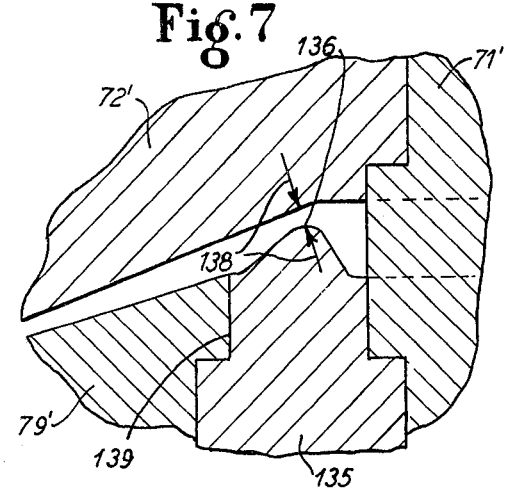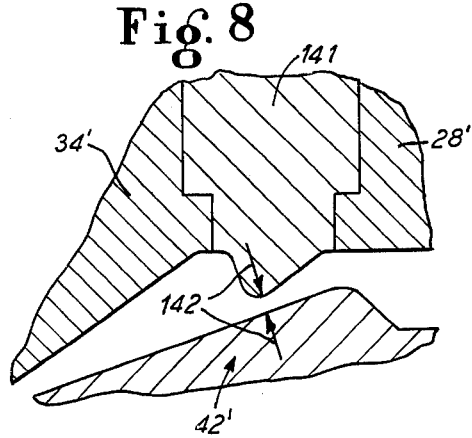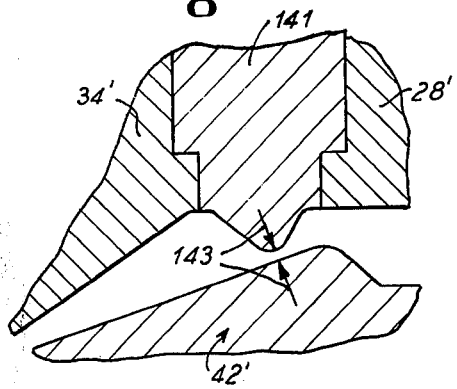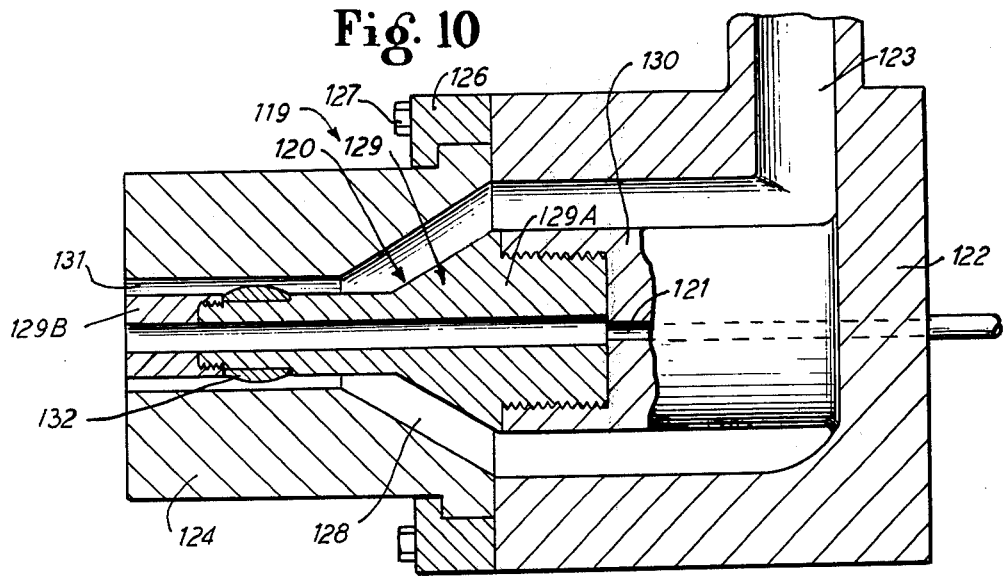

ANNULAR EXTRUSION DIE WITH BACK PRESSURE CONTROL

BACKGROUND OF THE INVENTION

Tubing, pipe, parisons, and similar profiles may be made using a round circular die having a mandrel or pin to form the inside surface of the tube. In tubing dies of the inline type where the extrudate moves in the same direction as the extruder (as opposed, for example, to a die of the crosshead type where the melt flow changes direction, usually 90° with respect to the extruder), a spider is used to support the mandrel in spaced relationship to the die body as a melt moves through and around the circumferentially spaced spider fingers supporting the mandrel. There is tendency for depressions or stripes, sometimes called weld lines, to appear in the walls of the product extrudate which are undesirable product deficiencies but which are particularly common in profiles of certain types of polymers, such as polyvinylchloride, and the like, which are commonly molded under conditions of temperature and pressure which make the polymer being extruded have less fluidity than with certain other types of plastics, so that after passing through such spider, such melt material does not flow circumferentially completely together again before the extrudate leaves the land portion of the die and the polymer is cooled. Extruded tube wall irregularities may also occur in dies of crosshead type owing to non-uniformity in the melt as extruded.

Heretofore, the art has controlled extruded tube wall irregularities, including spider induced striations, regulating the back pressure of a melt to help stabilize the flow of melt material through the die by means of a breaker plate (which may also be used to support a screen pack). After a melt passes through the breaker plate (and screen pack or valve as such is used), it flows through an adapter which channels the melt flow to and into the die.

Certain problems exist with the use of braker plates. For one thing, a breaker plate must be very carefully designed to avoid pockets in which material flow ceases and the stagnant material degrades or discolors. Also, weld lines may appear in a finished product because of the hold-up of the melt by the breaker plate and subsequent localized overheating of a resin. In addition, a breaker plate usually has a fixed shape, so that as molding variables are changed, it is commonly necessary or desirable to change the breaker plate. To change a breaker plate requires, essentially, a lengthy shut-down of both the extruder and die assembly. Further it is extremely difficult to design a breaker plate which will so control the back pressure associated with a melt that, after a melt has passed through the spider fingers, the melt stream is caused to sufficiently intermix with itself to avoid striations and the like in the extruded profile.

While it has heretofore been proposed to include chokes along the melt flow path after a spider and before the die opening for use in film dies of the side-fed and bottom-fed type with the aim of producing uniform, weld line free distribution of the resin before it leaves the die annulus, (see, for examples, Poux U.S. Pat. No. 3,409,941 and pages 456 and 460 of Modern Plastics Encyclopaedia, Volume 46, October, 1969), such prior art chokes have been a completely integral part of the die assembly, being formed as a ridge on the wall of either the die body or the mandrel, so that there has been no way of changing the choke or the choke dimensions other than by replacing an entire die body or mandrel.

Particularly in the case of parisons of the type made in a center bed die, for example, all control over dimensions and wall thickness profile is maintained not only by the size of the annular slit of the die, but also by the adjustment of the concentricity of the die body and internal mandrel. As those skilled in the art will appreciate, the internal construction of a parison die is considerably more complex than for an ordinary pipe die because of the need to eliminate weld lines and to achieve a smooth flow of material from the adaptor or manifold than compared to the melt channels in an ordinary pipe die. This is because the parison tubing is blown or distended after it leaves the die to a much thinner wall section than is encountered in the extrusion of heavy wall pipe, and failure at weld lines during and after blowing operation is more likely to occur under this type of condition. Furthermore, in extruding a parison for intermittent blow molding operations, the flow through the extrusion die is a "stop and go" procedure, although, in multiple blow molding machines, in which a mold sequentially clamps a continuously extruded parison tube, the flow through the extrusion die remains constant, which is a preferred type of die when extruding thermally sensitive materials, because the continuous flow through the extruder and die minimizes residence time and hence reduces the possibility of material degradation.

Insofar as is known, no one has heretofore produced a tubing die having an interchangeable choke ring means mounted on either the mandrel or the die body so as to provide the capacity for changing individual choke ring characteristics, in a simple and easy manner without requiring one to tear down the extrusion die without a lengthy equipment down time, as when reworking or changing a mandrel or die body, or the characteristics thereof, to achieve a flow characteristic different from a previous such member, or characteristic thereof.

BRIEF SUMMARY OF THE INVENTION

The present invention provides improved tubing dies, each such die having a replaceable choke ring mounted either on the mandrel or on the die body and being adapted to produce surface irregularity-free parisons and other similar tubular profiles.

The die construction of this invention permits one to easily and conveniently replace the choke ring and saves on down time, die manufacturing costs and similar expenses.

The invention provides a demountable choke ring for an in line tubing mounted demountably in either in the die body or in the mandrel after the spider and before the die output orifice.

The invention further provides an interchangeable choke ring adapted for use on a cross head die.

The invention further provides dies using such demountable choke rings.

A demountable choke ring used in the die of this invention characteristically protrudes into the passageway defined between the mandrel means and the die body of a tubing die so as to locally and circumferentially reduce such passageways' cross-sectional area and thereby smooth out non-uniformities in a melt passing thereover.

Other objects, purposes, advantages and functions of the present invention will become apparent to those skilled in the art from a reading of the present specification, drawings and claims.

BRIEF DESCRIPTION OF THE DRAWINGS

In the drawings:

FIG. 6 is a view similar to FIG. 5 but showing yet another alternative embodiment;

FIG. 7 is a view of the embodiment of FIG. 6 but with the choke ring thereof reversed;

FIG. 8 is a view similar to FIG. 5 but showing still another alternative embodiment, this one similar to the embodiment of FIGS. 1–3;

FIG. 9 is a view of the embodiment of FIG. 8 but with the choke ring thereof reversed; and FIG. 10 is a view similar to FIG. 5 but showing a further alternative embodiment.

DETAILED DESCRIPTION

Figure 1:
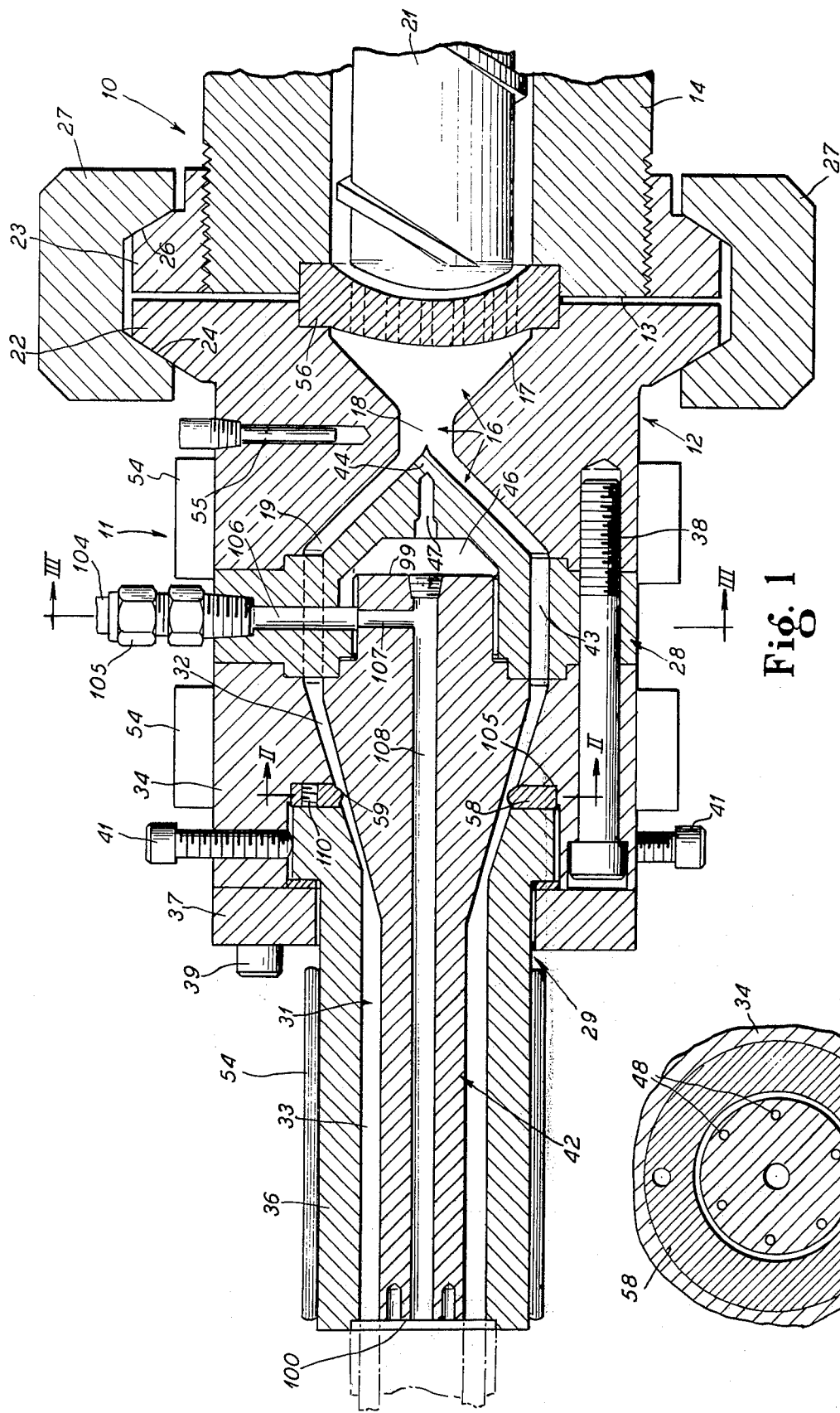
FIG. 1 is a vertical longitudinal sectional view taken along the axis of one embodiment of a die body assembly of the present invention shown in functional combination with an inline extruder for illustrative purposes, some parts shown in section and some parts broken away.

Turning to FIG. 1, there is seen in combination a single screw extruder of the prior art, herein designated in its entirety by the numeral 10, with an embodiment of annular extrusion die assembly of this invention, herein designated in its entirety by the numeral 11. Die 11 is suitable for making parisons, but could also be used for making tubing, pipe, and the like, in combination with extruder 10. Die 11 is of the end center fed type and may be used with any convenient extruder, as those skilled in the art will appreciate.

Die 11 incorporates a die adapter 12 which is adapted for mounting in face-to-face engagement with the face 13 of the barrel 14 of extruder 10. The die adapter 12 defines therewithin a channel or cavity 16 which is adapted to receive melt from the barrel 14 and direct same into the interior of die assembly 11 in a predetermined, optimized manner, depending upon materials being molded, conditions, equipment, etc. Channel 16 has a flared opening 17 which is adjacent face 13 and which is then necked down to a throat 18 in its midsection, usually at an angle of 60° or less as those skilled in the art will appreciate. Throat or neck portion 18 then widens as one proceeds down cavity 16 in a funnel-shaped manner to provide a mouth portion 19. Channel 16 is generally coaxial with the screw 21 of extruder 10. A flange 22 on die adapter 12 and a flange 23 on barrel 14 are each provided with tapered surfaces 24 and 26, respectively, so that a two-piece clamp 27 will lock on the tapered surfaces 24 and 26, engage the die adapter 12 and the barrel 14, and bring such within abutting, aligned engagement with a good seal therebetween.

A spider 28 abuts the die adapter 12 adjacent mouth portion 19, and an elongated die body, herein designated in its entirety by the numeral 29, abuts spider 28. Die body 29 is formed by the combination of mounting ring 34, die barrel 36, and centering ring 37. The die body 29 defines therewithin an elongated cavity 31 which has a flaired cross-sectionally circular entrance portion 32 which interconnects with a cylindrical land portion 33. The land portion 33 of cavity 31 has a predetermined ration of length to width, as those skilled in the art will appreciate, since such ratio has a critical bearing upon a profile made with the die assembly 11. Cavity 31 is generally coaxial with screw 21 in the embodiment shown.

Spider 28 has an enlarged midsection or nose 44 which protrudes into the mouth portion 19 so that the tip of nose 44 is in axially spaced relationship to the throat 18, and the sides of nose 98 are in radially spaced relationship to the mouth portion 19, of die adapter 12 along the axis thereof. The central region of spider 28 is hollowed and adapted for mating and supporting engagement with a mandrel 42, as will be hereinafter explained.

Mounting ring 34 and spider 28 are conveniently secured to die adapter 12 by means of bolts 38 which engage appropriately threaded sockets formed in die adapter 12. The centering ring 37 abuts mounting ring 34 and is secured thereto by means of bolts 39. Centering bolts 41 in cooperation with centering ring 37 position and hold the die barrel 36 in desired coaxial centered relationship to the screw 21 about mandrel 42.

Mandrel 42 is mounted coaxially within die body 29 and spider 28. The mandrel 42 continuously extends from one end face 99 located interiorly of spider 28 to an opposite end face 100 adjacent the terminus of land portion 33 of cavity 31. The mandrel 42 is in radially spaced relationship to, respectively, the flaired entrance portion 32, and the land portion 33, of die body 29, along the axis thereof. Thus, in assembled die assembly 11, cavity 31 is confined to a circumferentially continuous, axially extending passageway in mandrel 42 and a continuous annular passageway extends through die 11 on either side of spider 28 beginning in throat 18 and ending at face 100.

Figure 2:
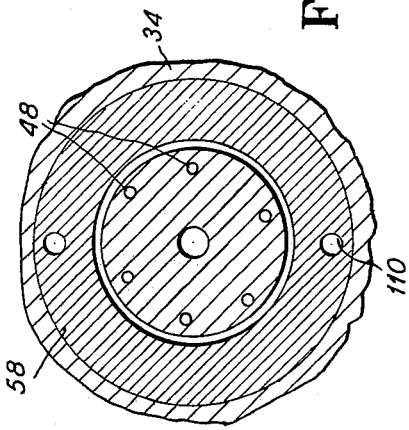
FIG. 2 is a vertical transverse sectional view taken along the line II—II of FIG. 1.

As indicated, mandrel 42 is supported and centered by spider 28. Spider 28 has defined therein conventionally a plurality of axially extending, circumferentially spaced apertures 43 (see FIG. 3) which interconnect the passageways formed in cavities 16 and 31 on either side of the spider 28. To regulate temperatures of spider 28 and, especially, of mandrel 42, during operation of die 11, cooling channels 45, 46 and 47 are provided in spider 28. Channels 47 extend through the fingers 101 in spider 28 between channels 43. Channels 47, in turn, join channels 48 in mandrel 42. Fittings 102 interconnect channels 47 with pipes 103 which convey a cooling fluid, such as air or water, into spider 28 and mandrel 42 for circulation and away therefrom. A sequence of pipe 104, fitting 105, channel 106 in spider 28, and channels 107 and 108 in mandrel 42 may be employed as a source of air in a flow molding operation (not part of this invention) to make parisons using die 11, as those skilled in the art will readily appreciate. The location of individual channels 48 in mandrel 42 is such as to achieve a predetermined desired cooling pattern in mandrel 42. Such location of individual channels 48 typically varies axially; one arrangement at a given section is illustrated in FIG. 2.

Electrical resistance heater bands 54 are circumferentially located exteriorly about portions of the combination comprising the die adapter 12, the spider 28 and the die body 29, and are adapted to regulate the temperature of the die assembly 11 during operation thereof. Temperature in the die assembly 11 is conveniently metered by means of thermocouples mounted in wells 55 or the like.

In face 13 of barrel 14 of extruder 10 across channel 16, a breaker plate 56 is provided. Those skilled in the art will appreciate that such a breaker plate 56 does not form part of the present invention and is not required for use with die assembly 11. Selection of a particular plate 56 for a particular application is influenced by a number of variables, especially the type of material being extruded through extruder 21, and operating conditions generally. Typically, a plate 56 may consist of a perforated material plate designed for minimum hangup of melt passing therethrough. A screen pack (not shown) adjacent breaker plate 56 may be placed in the extruder barrel 14 between the end of the screw 21 and the entrance to the adapter 12. The breaker plate 56 serves as a seal between the extruder barrel 14 and the adapter 12 and creates a back pressure to help stabilize the flow of material through the extruder 10. After a melt passes through breaker plate 56 (and any screen pack or valve utilized), it flows through the adapter 12 which channels melt flow into the passageways within die 11. If desired, the extruder barrel 14 may be provided with cooling means (not shown) to carry away excess heat and to permit rapid changes in the operating temperature which might be demanded when changing operating conditions or controlling melt temperature at a substantially constant value. Cooling systems in popular use involve air blowers for forced air circulation around the inside of the barrel as well as through the interior of the mandrel, or water cooling.

Seated between the mounting ring 34 and the die barrel 36 is a demountable choke ring 58 which has an annular protruding portion 59 which extends into the cavity 31 and which is adapted to constrict the flow of melt through cavity 31 from spider 28. The ring 58 is conveniently positioned in a circumferential recess on slot 105 formed circumferentially in the forward face of mounting ring 34 adjacent the rear end of die barrel 36. The choke ring 58 is clamped between ring 34 and barrel 36 by ring 37 and bolts 39. Observe that ring 58 is removable and changeable to another ring, 58, position 59 being sized as desired, by simply loosening centering bolts 41, removing bolts 39 and centering ring 37, and disengaging the die barrel 36 from its mounted position in die 11 as shown in FIG. 1. A reverse sequence is employed for reassembly. Puller screw holes 110 in choke ring 58 may be used if necessary or desirable to remove choker or choke ring 58 from recess 105. Any convenient arrangement of elements may be employed to demountably mount a choke ring 58 in die 11.

Choke ring 58 permits control of back pressure in a melt after passage thereof through spider 28. The degree of annular restriction or constriction circumferentially in cavity 31 is controllably varied by choice of profile for portions 59 of choke rings 58. Choke ring 58 also changes back pressure in extruder 10 which improves mixing of polymer melt and heating thereof. Any convenient or desired cross-sectional shape or combination may be employed for a choke ring 58.

Use of breaker plate 56, fixed valve, or the like, before die 11 for back pressure regulation of melt in die 11 may, if desired, be virtually eliminated with a choke ring 58 in some types of extruding operations, and with certain types of polymers, including for example, polyvinyl chloride, as those skilled in the art will appreciate.

The fact that choke ring 58 is replaceable permits an operator to find the most effective compromise between necessary choking to eradicate polymer memory problems and to create enough back pressure to fuse splits in a melt caused by passing through spider 28, and, at the same time, permit operation at highest practical melt throughput rates. Thus, different choke rings 58 can be interchanged one with another in particular die 11 until the best possible combination of particular equipment, melt, and process variables is reached. Minimum equipment down times are associated with use of a die 11 fitted with choke rings 58 are typically reduced compared to dies not having such rings 58. Observe that a choke ring 58 permits changing characteristics of a mandrel 42, for example, without remachining same, which can be an enormous saving in expense and time.

In die 11, clamp 27 may be replaced by any conventional clamping means such as a head clamp, a bolt-on flange, a swing gate, a manual power clamp, a hydraulic clamp, or the like, as those skilled in the art will appreciate.

Also, in die 11, any convenient technique may be employed to mount the various components comprising mounting ring 34 and die barrel 36 together other than the combination of centering ring 37 with bolts 39 and 41.

While in die 11, a choke ring 58 is associated with die body 29 and has an inner circumferential surface adapted to affect and regulate melt flow, a choke ring may alternatively be associated with a mandrel in which event such choke ring has an outer circumferential surface similarly adapted to affect and regulate melt flow, as those skilled in the art will appreciate. Thus, turning to FIG. 5, there is seen a combination of a conventional single screw extruder, herein designated in its entirety by the numeral 61, with an annular extrusion die assembly of this invention, herein designated in its entirety by the numeral 62. Die 62, like die 11, is suitable for making tubing, pipe, parisons, and the like when in combination with an extruder such as, for example, extruder 61, though many different extruder arrangements may be employed with die 62 as those skilled in the art will appreciate.

Die 62 incorporates a die adapter 63 which is adapted for mounting against the face of barrel 64 of extruder 61. The die adapter 63 defines therewithin a cavity 65 which is similar to the cavity 16 of die adapter 12 in die assembly 11. A flange 66 which is mounted to the die adapter 63 by means of bolts 67 together with a flange 68 on barrel 64 serve to mount the die adaptor 63 to the face of barrel 64 by means of nut and bolt assemblies 69 or the like.

An annular spider 71 abuts the die adapter 63, and an elongated die body, herein designated in its entirety by the numeral 72, abuts spider 71. Die body 72 defines therewithin an elongated cavity 73 which has a flared, cross-sectionally circular entrance portion 74, and a terminal cylindrical land portion 76. Land portion 76 of cavity 73 has a predetermined ratio of length to width thereof, as is usual in such assemblies. The cavity 73 is generally coaxial with the screw 78 of extruder 61.

Mounted coaxially with the screw 78 is a mandrel assembly herein designated in its entirety by the numeral 79. The mandrel assembly 79 is generally in radially spaced relationship to the adjacent wall of the die body 72, as those skilled in the art will appreciate. The mandrel assembly 79 here comprises three elements, a mandrel nose cone 81, a cooling mandrel 82, and a shaping mandrel 83. The mandrel nose cone 81 is secured to spider 71, as is the cooling mandrel 82, but by bolts 84. The shaping mandrel 83 is similarly secured to the cooling mandrel 82 by bolts (not shown).

Circumferentially continuous, axially extending passageways defined between mandrel assembly 79, and, respectively, die adapter 63, in die body 72 on either side of spider 71 are interconnected together by channels or apertures 51 formed in spider 71 and provides means for regulating temperatures in die 62 during operation thereof.

As was the case with spider 28, in die 11, and, expecially, mandrel 42 in die 11, spider 71 in die 62 and, especially, mandrel assembly 79 in die 62 are provided with cooling channels 87 (not detailed for spider 71). An air diffuser 86 secured to cooling mandrel 82 aids in circulating cooling air against back wall surfaces of cone 81. Conventional flow patterns are utilizable. A central or axial channel 52 for an air blowing stem is provided in shaping mandrel 83 for blow molding purposes (not part of this invention).

To mount die adapter 63 and die body 72 together, a clamp assembly 89 is employed. Clamping legs 90 (pair) compress together a shoulder 91 on die adapter 63 and a shoulder 92 on die body 72 with the aid of bolts 94A and 94B which are threadably engaged within shoulder 91, alignment being achieved using bolts 93 which extend radially through a spacing sleeve 80. However, any convenient fastening means may be employed, as those skilled in the art will readily appreciate.

A breaker plate (not shown) may be employed, if desired, in place of spacer ring 114, but here screw body 78 extends into the mouth of adapter 63 in longitudinally spaced relationship to the throat portion 85 of adapter 63 but in radial, spaced relationship to the adjacent walls thereof. The arrangement shown in one preferred equipment arrangement for use in extruding a polymer such as polyvinyl chloride.

Electrical resistance heater bands 112 are circumferentially located exteriorly about portions of the combination comprising the die adapter 63, the spider 71 and die body 72, and are adapted to regulate the temperature of the die assembly 62 during operation thereof. Temperature in the die assembly 62 is conveniently metered by means of thermocouples, such as thermocouple 113.

Mounted on the shaping mandrel 83 adjacent the spider 71 is a choke ring 96. A circumferentially located radially outwardly projecting edge 97 on choke ring 96 partially fills the melt passageway 73 and serves to blend together any fuse lines in a melt passing thereover caused by the passage of melt through the spider 71. A choke ring 96 is conveniently interchangeable with other choke rings 96 in a manner as described above in reference to choke ring 58 of die 11. Here, disassembly is accomplished by removing clamp assemblies 89 from their engaged position as those skilled in the art will appreciate. Choke ring 96 is clamped in position between the rear radial end of shaping mandrel 83 and the forward radial face of spider 71. Observe that by this arrangement back pressure on a melt is developed immediately after spider 71 to fuse melt separations together. Choke ring 96 functions similarly to choke ring 58 of die and has similar properties and advantages. In die 62, choke ring 96 is seated in mandrel assembly 79 in contrast to choke ring 58 of die 11 which is seated in die body 29.

Figure 5:
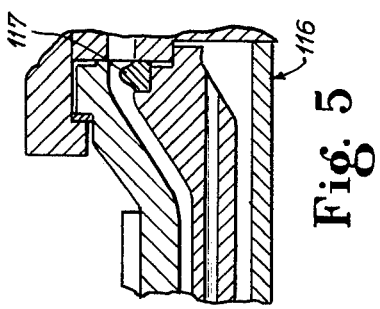
FIG. 5 is a fragmentary longitudinal sectional view taken along the axis of another alternative embodiment of a die assembly of the present invention similar to the embodiment of FIG. 4.

In FIG. 5, a die assembly of the invention, herein designated in its entirety by the numeral 116, is partially shown. Die 116 is similar to die 62 in positioning of its choke ring 117, but has a different mandrel/die body size interrelationship and a different circumferential edge profile.

Dies 11, 62 and 116 use appropriate conventional seals and sealing means, as those skilled in the art will appreciate, but not generally shown in these Figures.

In a die assembly 11, 62 or 116 of this invention, any convenient arrangement and configuration of spider and mandrel, and of subassemblies thereof may be employed, and many different arrangements of elements may be employed. It will be appreciated, however, that in a die assembly of this invention, a mandrel and/or a die body are so constructed as to permit one to seat demountably a choke ring such as 117, 96, and 58 after a spider and before the land region in an end center die.

While center fed dies, such as dies 11, 62 or 116 are very much preferred forms of the present invention, it will be appreciated that interchangeable choke ring means in a tubing die as taught by the present invention may also be utilized in side fed dies wherein the mandrel is end supported by a die body rather than by a spider. For example, referring to FIG. 10, there is seen a die assembly 119 which includes a tapered mandrel 120 having a bore 121 therethrough. A die head 122 having an input channel 123, and a die body 124 are attached together in axially aligned, adjacent relationship to one another by a flange 126 and bolts 127 which are attached to die head 122. The die head 122 and the die body 124 are positioned around the mandrel 120 so that their inner surfaces define a passage 128 with the outer surface of the mandrel 120. Passage 128 is in communication with input channel 123 in die head 122 so that a melt may be delivered from a plasticizing means, such as an extruder (not shown), to the die 119.

Mandrel 120 comprises a threaded male section 129 which cooperates with a corresponding threaded female section 130. The die head 122 and the die body 124 and the section 129 and 130 of mandrel 120 are in axial registration to provide the passage 128 in the die 119 to allow a portion of melt to enter into and through an annular orifice 131 formed within the male section 129 of the mandrel 120.

Section 129 of the mandrel 120 is comprised of two axially aligned longitudinally adjacent sections 129A and 129B. Section 129A has a forward end portion adapted to be vertically received within the rearward mating region of the forward section 129B on mandrel 120. Behind the threaded portion of section 129A a shoulder is formed thereon over which a choke ring 132 is adapted to slidably engage when section 129B is detached from section 129A. Choke ring 132 functions to smooth out a melt over traversing passage 128 and to create a back pressure in such passage 128 to distribute uniformly the flow of melt issuing from annular orifice 131, thus maintaining controlled thickness and uniformity of such an extrudate. The choke ring 132 may be interchanged with other choke rings 132 (not shown) having different profiles on their respective circumferential outer surfaces so as to permit one to seek out for a given die 119 operated with a particular plastic under particular process conditions an optimum choke ring.

The profiles of a choke ring may be varied so as to provide differing melt flowing characteristics thereover depending on whether or not the choke ring is oriented with respect to a die in one direction or the choke ring is turned through 180° and mounted in a reverse direction. For example, referring to FIG. 6 and 7 there is seen a choke ring 135 wherein the peripheral, circumferential extending outer edge 136 thereof defines a ridge which is offset from the center of the choke ring 135 radially and axially so that a shear rate and back pressure associated with melt flowing over the choke ring 135 when in the configuration shown in FIG. 6 is greater than when the choke ring 135 is reversed and mounted in the configuration shown in FIG. 7. Thus, to reduce choking, as when a degree of choking is not necessary and an operator wishes to decrease shear rate and/or back pressure, reversing a choke ring 135 enlarges the flow passage from a width extending between the arrows 137 in FIG. 6 to a larger width shown by the arrows 138 in FIG. 7. The passage in FIG. 7 permits an increased output of melt as those skilled in the art will appreciate. With a reversible choke ring construction, such as illustrated by the embodiment shown in FIGS. 6 and 7, the user has the option of balancing quality versus output using a single choke ring 135 if desired. Observe that the choke ring 135 is equipped with locating surfaces 139 for use in mounting and using a choke ring 135 in a die as shown.

Figure 4:
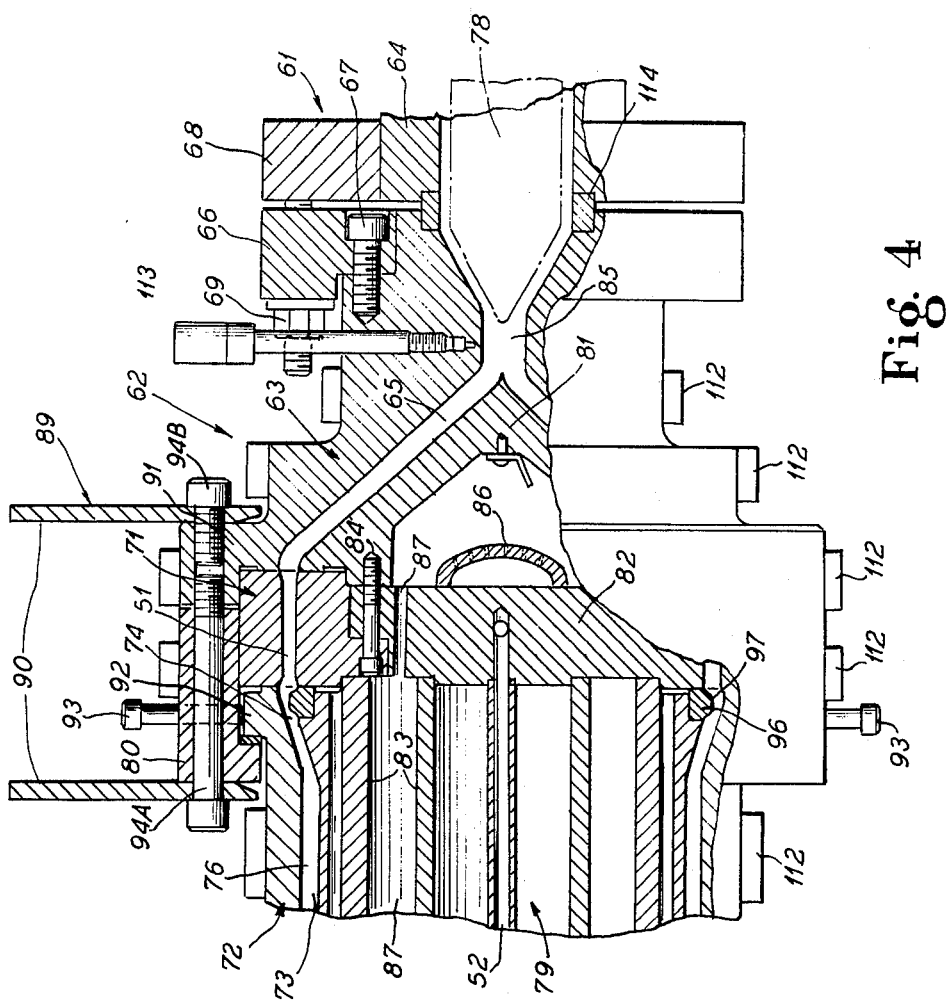
FIG. 4 is a vertical longitudinal sectional view taken along the axis of an alternative embodiment of a die assembly of the present invention shown in functional combination with an inline extruder for illustrative purposes, some parts broken away and some parts shown in section.
Figure 3:
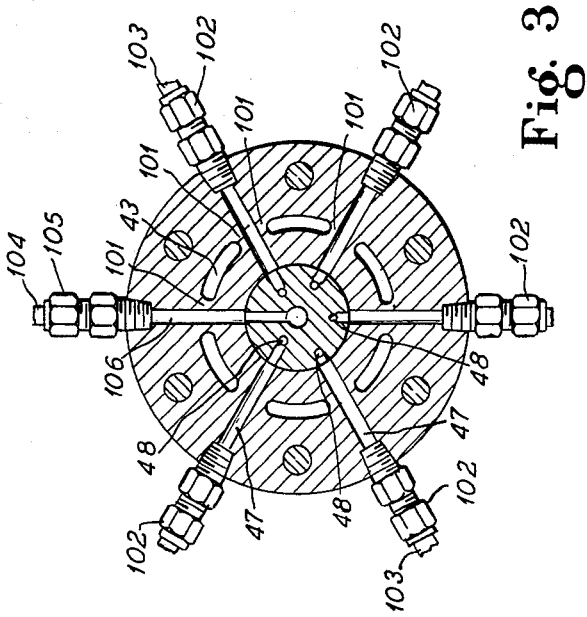
FIG. 3 is a vertical transverse sectional view taken along the line II—II of FIG. 1.

While the die illustrated in FIGS. 6 and 7 may be considered to be similar in construction to that illustrated in FIG. 4, the die illustrated in FIGS. 8 and 9 may be considered to be similar to that shown in FIGS. 1–3. Thus, in the embodiments of FIGS. 8 and 9, the melt passes over the circumferential inner surface of a choke ring 141 whereas in the case of the choke ring 135 the melt passes over the outer circumferential surface as in the case of the choke ring 135. Reversal of the choke ring 141 results in changing the size of the passageway through which a melt passes, as illustrated by the arrows 142 in FIG. 8 and by the arrows 143 in FIG. 9, similar to choke 135.

In FIGS. 6 and 7, components similar to the die of FIGS. 1–3 are similarly numbered but with the addition of prime marks thereto, while components similar to the die of FIG. 4 in FIGS. 8 and 9 are similarly numbered but likewise with the addition of prime, for identification purposes.

Other and further embodiments and modifications within the spirit and scope of the present invention will be apparent to those skilled in the art from a reading of the present specification and drawings and no undue limitations are to be associated therewith.

The claims are:

1. An extrusion die for making tubing, parisons, and the like, comprising in combination A. a die adapted for mounting in face to face engagement with the face of a prechosen extruder, said die adapter defining therewithin a generally centrally located passageway.

B. an annular spider means adjoining said die adapter, and having radially extending supporting fingers, C. an elongated die body means circumferentially adjoining said spider means through said supporting fingers, said die body defining therewithin an elongated cavity having a flared cross-sectionally circular entrance portion and a terminal, cylindrical land portion, said land portion having a predetermined ratio of the length thereof to the diameter thereof, D. elongated mandrel means supported by said spider means and continuously extending within said cavity in radially spaced relationship to said die body to define in combination with said spider means a passageway between said mandrel and said die body means and between said entrance portion and the end of said land portion, said passageway being annular in cross section except in the region of said spider means where the apertures between said supporting finger interconnect with said passageway, E. said die body means and said mandrel means in combination between said spider means and said land portion defining convergence in said passageway, F. a choke ring demountably seated on said mandrel means on either said mandrel means or on said die body means between said spider means and said land portion and adapted to reduce circumferentially the cross section of said passageway to a predetermined extent, said choke ring being reversible in position said choke ring being assymetrical as respects a hypothetical centerplane extending through said choke ring perpendicularly to the axis thereof, G. shoulder means defined in either said mandrel means or said die body means and adapted for so seating said choke ring thereon, as the case may be, H. the interrelationship between said choke ring and said convergence in said passageway being such that the radial distance between said choke ring and the opposed wall of said passageway has either one of two different values depending upon which way said reversable choke ring is so seated, and I. mounting means adapted to maintain said die adapter, said spider means, said die body means, said mandrel means, and said choke ring in fixed, predetermined relationship to one another and further adapted to permit at least partial disassembly and reassembly of said mandrel means and said die body means to an extent necessary for mounting and demounting said choke ring from said shoulder means.

2. The die of claim 1 wherein, in said mandrel means and said spider means,

A. said mandrel means continuously extends from a position adjacent, but axially spaced from, the passageway in said die adapter to said annular orifice to define a circumferentially continuous, axially extending passageway forwardly of said spider, and B. said mandrel means in combination with said spider provides a plurality of axially extending, circumferentially spaced apertures interconnecting said passageways on either side of said spider.

3. The die of claim 1 wherein said spider means has an integral nose extending into the passageway of said die adapter.

4. The die assembly of claim 1 wherein said die body comprises a die barrel and a mounting ring in axially adjacent relationship to one another and said choke ring is seated therebetween.

5. The die body of claim 1 wherein said mandrel includes a melt shaping portion forwardly of said spider as respects the direction of melt flow therethrough and said choke ring is seated on said shaping portion adjacent said spider.

6. An annular extrusion die for making tubing, parisons, and the like when in combination with a single screw extruder, said die being adapted to control back pressure, comprising in combination A. a die adapter adapted for mounting in face to face engagement with the face of the barrel of a single screw extruder, said die adapter defining therewithin a generally funnel-shaped interior having a mouth portion and a neck portion, with said neck portion being adapted to be adjacent said barrel face, said funnel-shaped interior being generally coaxial with the screw of said extruder.

B. an annular spider means adjoining said die adapter adjacent said mouth portion, and having radially extending supporting fingers, C. an elongated die body means generally circumferentially adjoining said spider means through said supporting fingers, said die body defining therewithin an elongated cavity having a flared cross-sectionally circular entrance portion and a terminal, cylindrical land portion, said land portion having a predetermined ratio of the length thereof to the diameter thereof, said cavity being generally coaxial with said screw, D. mandrel means supported by said spider means generally adapted to be coaxial with said screw and continuously extending within said die body means from said spider means to the end of said land portion in radially spaced relationship to said die body, E. said mandrel means and said spider means in combination defining within said elongated cavity a passageway between said mandrel and said die body means extending from a position axially adjacent said neck portion to the end of said land portion, said passageway being annular in cross section except in the region of said spider means, F. said spider means further providing between said supporting fingers thereof a plurality of axially extending circumferentially spaced apertures interconnecting said passageway, G. said die body means and said mandrel means in combination between said spider means and said land portion defining convergence in said passageway, H. channel means defined in said mandrel means and adapted to interconnect with exterior conduit means extending through said spider means normally and further adapted for circulation of temperature regulating fluid therethrough, I. heater means circumferentially located exteriorly about at least a portion of the combination comprising said die adapter, said spider means and said die body means, and adapted to regulate the temperature thereof, J. a choke ring demountably seated in either said mandrel means or in said die body means between said spider means and said land portion and adapted to reduce the cross section of said passageway, said choke ring being assymetrical as respects a hypothetical centerplance extending through said choke ring perpendicularly to the axis thereof, said choke ring being reversably seatable as so demountably seated, K. shoulder means defined in either said mandrel means or said die body means and adapted for so seating said choke ring thereon, as the case may be, L. the interrelationship between said choke ring and said convergence in said passageway being such that the radial distance between said choke ring and the opposed wall of said passageway has either one of two difference values depending upon which way said reversable choke ring is so seated, and M. mounting means adapted to maintain said die adapter, said spider means, said die body means, said mandrel means, and said choke ring is fixed, predetermined relationship to one another and further adapted to permit at least partial disassembly and reassembly of said mandrel means and said die body means to an extent necessary for seating and unseating said choke ring.

* * * * *

UNITED STATES PATENT AND TRADEMARK OFFICE
CERTIFICATE OF CORRECTION

PATENT NO. : 3,899,276
DATED : August 12, 1975
INVENTOR(S) : Nickolas Sokolow

It is certified that error appears in the above-identified patent and that said Letters Patent are hereby corrected as shown below:

Column 10, line 1, Please insert --adapter-- between "die" and "adapted".

Signed and Sealed this twenty-fifth Day of November 1975

[SEAL]

Attest:

RUTH C. MASON
*Attesting Officer*

C. MARSHALL DANN
*Commissioner of Patents and Trademarks*